Figure 1:
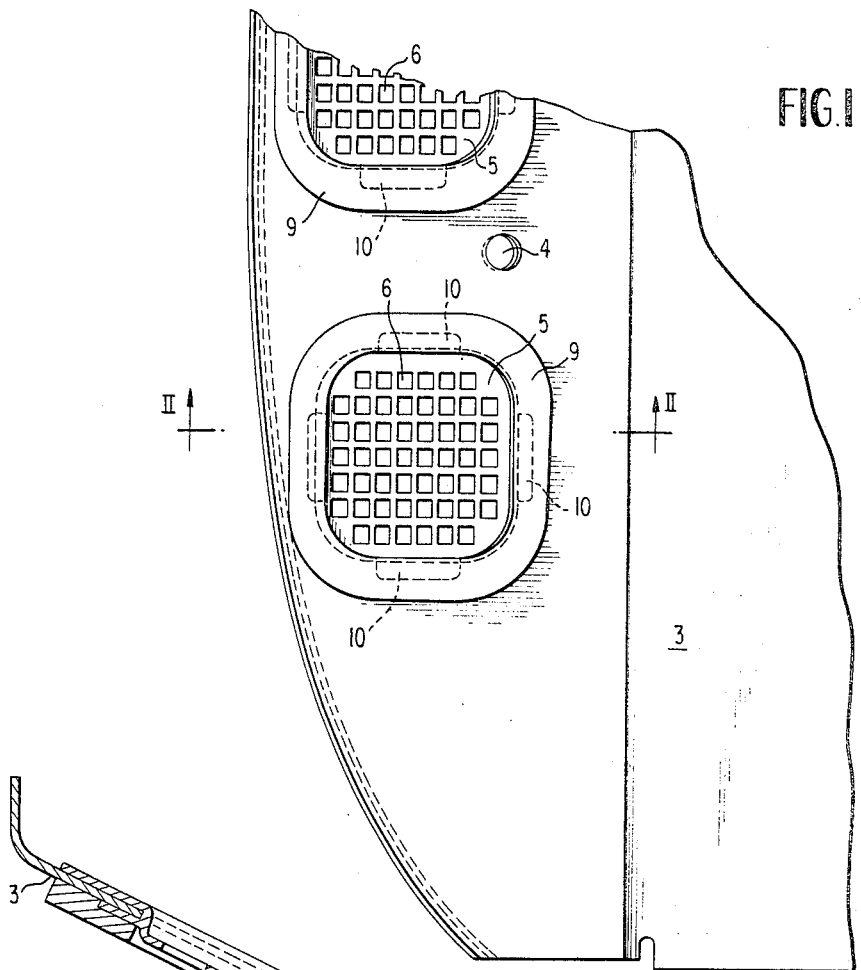

INVENTOR
HANS FROITZHEIM
BY *Dicke + Craig*
ATTORNEYS

United States Patent Office 3,481,819
Patented Dec. 2, 1969

3,481,819
FLOOR COVER FOR THE FORWARD PORTION OF VEHICLES, ESPECIALLY MOTOR VEHICLES
Hans Froitzheim, Sindelfingen, Wurttemberg, Germany, assignor to Daimler-Benz Aktiengesellschaft, Stuttgart-Unterturkheim, Germany
Filed Aug. 22, 1966, Ser. No. 574,146
Claims priority, application Germany, Aug. 25, 1965, D 48,046
Int. Cl. B32b 3/10, 5/20
U.S. Cl. 161—38                    5 Claims The present invention relates to a floor cover for the pedal floor in the forward section of vehicles, especially of motor vehicles, which forms a mat ready-to-use as unit, consisting of a rubber plate, of a barrier or insulation layer disposed therebelow and of a grid-like screen plate inserted into an interruption which is foamed-in below the rubber plate simultaneous with the foaming-in from below of the barrier or insulation layer. Damages result easily at the transition places between the grid-like screen plate and the rubber plate as a result of the shoes of the driver sliding over the same. In order to avoid this, it is proposed according to the present invention to provide a frame surrounding the grid-like screen plate which, for purposes of avoiding additional transition places and of additional securing elements, is to be constructed in one piece with a grid-like screen plate.

It is recommended according to the present invention to provide the frame with a double rim whereby the two rim parts accommodate therebetween the rubber plate rim. The upper rim part may thereby project beyond the lower rim part. The insertion of the frame into the rubber plate rims is thereby facilitated while maintaining a sufficiently large support of the grid-like screen plate on the rubber plate. A further facilitation of the insertion can be achieved in that the lower rim part is provided only along certain sections.

Accordingly, it is an object of the present invention to provide a floor cover for vehicles, especially for the pedal floor portion of the driver compartment which avoids the aforementioned shortcomings encountered with the prior art constructions.

It is another object of the present invention to provide a floor cover for the floor of the driver section of a motor vehicle which minimizes the danger of damages as a result of the sliding movements of the feet of the driver while actuating the various operation levers and/or switches.

A further object of the present invention resides in a unitary ready-to-use floor mat provided with relatively large screened apertures for the admission of fresh air which is simple in construction, can be readily manufactured in a relatively inexpensive manner and assures long length of life in service.

Figure 2:
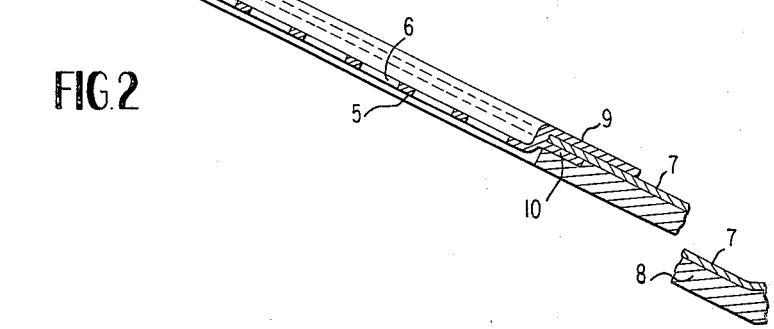

These and further objects, features and advantages of the present invention will become more obvious from the following description when taken in connection with the accompanying drawing which shows, for purposes of illustration only, one embodiment in accordance with the present invention, and wherein:

FIGURE 1 is a partial top plan view of a floor cover in accordance with the present invention; and FIGURE 2 is a cross-sectional view taken along line II—II of FIGURE 1.

Referring now to the drawing wherein like reference numerals are used throughout the two views to designate like parts, the cover 3 of the pedal floor of a motor vehicle is provided in the usual manner with apertures 4 for the operating levers and the like. Additionally, the cover 3 is provided with larger apertures 5 for the supply of fresh air which are covered by grid-like screen plates 6 projecting over and overlapping with the rims of the apertures 5. Such a floor mat has been described, in general, in the co-pending application Ser. No. 509,855, filed Nov. 26, 1965, and entitled, "Floor Mat for Vehicles," now Patent No. 3,362,316, the contents of which are incorporated herein by reference to the extent necessary.

The cover 3 according to the present invention is constructed as a two-layer mat whereby the upper layer consists of a relatively thin rubber plate 7 onto which is foamed from below a relatively thicker barrier or insulation layer 8 of any conventional foaming and insulation material.

The grid-like screen plate 6 is constructed as unitary dish-like plate structure having a screened flat bottom apertured in a grid-like manner and is equipped with two rim portions 9 and 10 of differing widths.

The lower rim portion 10 is provided only within certain sections of the plate structure. The distance of the two rim portions 9 and 10 corresponds to the thickness of the rubber plate 7 which engages at the apertures 5 into the gap of the grid-like screen plate 6 formed between the rim portions 9 and 10.

After the insertion of the grid-like screen plate 6 into the rubber plate 7, the barrier or insulation layer 8 is foamed-in, in situ, so that a securely connected unitary floor cover results therefrom.

The rim portion 9 resting on the rubber plate 7 projects beyond the lower rim 10 to such a considerable extent that also with very strong loads on the grid-like screen plate 6 no tearing of the rubber plate 7 occurs.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A floor cover for the pedal floor of vehicles, especially motor vehicles, forming a unitary read-to-use mat comprising a rubber plate means provided with aperture means, grid-like screen plate means inserted into said aperture means, and foamed in situ insulation layer means, said screen plate means being securely held in the assembled position by the foaming in situ thereof simultaneously with the foaming in situ of the insulation layer means below the rubber plate means, and said grid-like screen plate means being of substantially flat dish-like construction with a grid-like apertured bottom and a double rim means.

2. A cover according to claim 1 wherein the distance between the two rim portions of the double rim means corresponds approximately to the thickness of the rubber plate means.

3. A cover according to claim 2, wherein the upper rim portion projects beyond the lower rim portion.

4. A cover according to claim 3, wherein the lower rim portions exist only within certain sections.

5. A cover according to claim 2, wherein the lower rim portions exist only within certain sections.

References Cited

UNITED STATES PATENTS

| | | | |
|---|---|---|---|
| 1,982,515 | 11/1934 | Hodes | 161—160 |
| 2,388,297 | 11/1945 | Slaughter | 161—38 |
| 2,966,436 | 12/1960 | Fox et al. | 161—114 |
| 3,283,692 | 11/1966 | Froitzheim | 98—2 |
| 3,362,316 | 1/1968 | Froitzheim et al. | 98—2 |

DOUGLAS J. DRUMMOND, Primary Examiner

U.S. Cl. X.R.

98—2; 161—113, 160